United States Patent [19]
Bader

[11] 3,752,193
[45] Aug. 14, 1973

[54] PNEUMATIC TWO-POSITION CONTROLLER
[75] Inventor: Horst Bader, Stuttgart, Germany
[73] Assignee: J. C. Eckardt A.G., Stuttgart, Germany
[22] Filed: Mar. 25, 1971
[21] Appl. No.: 128,063

[30] Foreign Application Priority Data
Mar. 25, 1970 Germany.................. P 20 14 307.1

[52] U.S. Cl....... 137/829, 235/201 ME, 137/625.48
[51] Int. Cl. .............................................. F15c 3/04
[58] Field of Search...................... 137/625.48, 81.5, 137/625.5, 625.49; 235/201 ME

[56] References Cited
UNITED STATES PATENTS
3,384,122  5/1968  Harpman...................... 137/625.64
3,540,478 11/1970  Ito................................. 137/625.5
3,168,898  2/1965  Samet......................... 235/201 ME
3,070,295 12/1962  Glattli......................... 235/201 ME
3,303,999  2/1967  Mamy.......................... 235/201 ME
3,311,301  3/1967  Chabrier et al............. 235/201 ME
3,319,885  5/1967  Eige............................ 235/201 ME
3,612,085 10/1971  Clark............................ 137/81.5 X
3,613,708 10/1971  Kampe et al.................. 137/81.5

Primary Examiner—Samuel Scott
Attorney—Craig, Antonelli, Stewart & Hill

[57] ABSTRACT

A pneumatic two-position controller in which the control point is adjusted pneumatically by means of a pressure distributor network connected between one output of a differential pressure amplifier and a source of auxiliary pressure, the pressure distributor network providing the control point pressure to one input of the differential pressure amplifier.

16 Claims, 3 Drawing Figures

Patented Aug. 14, 1973　　　3,752,193

INVENTOR

HORST BADER

BY Craig, Antonelli, Stewart & Hill

ATTORNEY

PNEUMATIC TWO-POSITION CONTROLLER

This invention relates to a pneumatic two-position controller, the control points of which can be adjusted pneumatically.

Two-position controllers generally are control devices capable of triggering switching processes when a variable is above and below the control point, which switching processes, for example, open and close a valve. Conventional devices of this type start, for example, with a measuring element (manometer, Bourdon spring, etc.) to which the variable is fed and which produces a deflection proportional to the value of this variable. This deflection is transferred to a control flapper, which operates, pneumatically or mechanically, two scanning devices. Thus, for example, in a conventional system, the control flapper interrupts the air stream between a jet nozzle and a collecting nozzle of a scanning device, the position of which is adjustable. These known two-position controllers are complicated, and therefore require a considerable amount of space.

It is the object of this invention to provide a pneumatic two-position controller which is simple to manufacture and operate and constitutes a compact design with a small number of structural parts.

The invention resides in providing a differential pressure amplifier having two input pressure chambers defined by elastic walls, one of which chambers is supplied with a pressure equal to the value to be controlled, whereas the second chamber is under the effect of a pressure value derived from a control point pressure distributor, the latter being fed by the output pressure of the differential amplifier and by an auxiliary pressure $P_H$. Due to this design, many of the mechanical parts required in conventional devices, such as scanning heads, control flappers, rotatable scanners, or the like, are eliminated. Therefore, the required amount of space occupied by the device of the present invention is very small. Also, the susceptibility of the device to trouble is minor.

In a further development of the invention, the provision is made to derive the auxiliary pressure $P_H$ likewise from a pressure distributor which is fed, just like the amplifier, by the inlet or supply air pressure $P_z$. This eliminates the need to provide a pressure generator for the control point pressure distributor.

It is advantageous, according to this invention, to utilize a differential pressure amplifier producing two output pressures $A^+$ and $A^-$ which change simultaneously, but in the opposite sense, in dependence on the difference between two input pressures $P_s$ and $x$ applied thereto. The pressure distributor, which serves to set the control points $p_{so}$ (upper control point) and $p_{su}$ (lower control point), is alternately fed by the output pressures $A^+$ and $A^-$. The ratio of the fluid throttle resistances of the pressure distributor determines the magnitude of the control pressures $P_{so}$ and $P_{su}$. In this arrangement, they are symmetrical to $A^+/2 = A^-/2 = P_z/2$.

In order to eliminate this symmetry of the control points to the output pressures, the provision is made, according to the invention, to utilize a further pressure distributor fed by only one of the output pressures $A^+$ or $A^-$. The control point pressure distributor, in this embodiment, is fed directly by one of the two output pressures, which is supplied to the amplifier indirectly via this pressure distributor.

These and other objects, features and advantages of the present invention will become more apparent from the following detailed description when taken in conjunction with the accompanying drawings, wherein.

Figure 1:
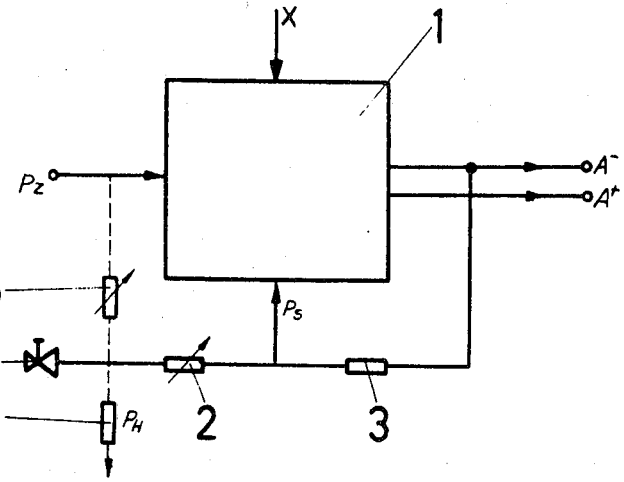
FIG. 1 is a schematic circuit diagram of a two-position controller forming one embodiment according to this invention, the control point pressure distributor of which is fed by one output of the differential pressure amplifier and by an adjustable auxiliary pressure $P_H$.

FIG. 1 shows a differential pressure amplifier 1, the output pressures $A^+$ and $A^-$ of which are proportional to the difference between the input pressure signals $x$ (variable) and $P_s$. The pressure $A^+$ denotes the output signal which likewise increases with a rising input pressure $x$. Consequently, the pressure $A^-$ increases with an increasing $P_s$ (control pressure) and drops with an increasing pressure $x$. The differential pressure amplifier is also fed by the amplification pressure $P_z$.

Between the fluid throttle resistors 2 and 3 of the control point pressure distributor, the control point pressure $P_s$ is derived and supplied to the second input pressure chamber of the differential amplifier 1. The fluid resistor 3 of the pressure distributor has supplied thereto the pressure $A^-$ output; and, the adjustable fluid throttle resistor 2 is fed by an adjustable auxiliary pressure $P_H$ from pressure reducer 4. The value of the control point $P_s$ is determined by the ratio of the fluid throttle resistors 2 and 3 and by the values of the pressures $A^-$ and $P_H$ supplied to the pressure distributor. For example, if $x$ reaches the value of $P_{so}$, then $A^-$ has assumed the maximum value, wherein $A^-$ max $= P_z$. The following equation applies to $P_{so}$:

$$P_{so} = 1/1 + \lambda \; A^- \text{ max} + \lambda/1 + \lambda \; 8 \; P_H$$

wherein $\lambda$ is the ratio of the fluid throttle resistors 2 and 3 of the pressure distributor.

Once $x$ has reached the value $x_{so}$, or has exceeded this value, the amplifier is actuated and pressure $A^-$ drops to atmospheric pressure $P_o$. Then, the pressure $P_{su}$ is present between the pressure distributor which now has $P_H$ fed thereto, in accordance with the relationship:

$$P_{su} = \lambda/1 + \lambda \; P_H$$

In both relationships, $\lambda$ and $P_H$ can be adjusted independently of each other, so that $P_{so}$ and $P_{su}$ also can be set independently of each other.

In place of the pressure reducer 4, required for adjusting the auxiliary pressure $P_H$, it is also possible, as shown in dashed lines in FIG. 1, to provide a further pressure distributor made up of the fluid throttle resistors 5 and 6, fed just like the amplifier 1 by the inlet air pressure $P_z$. In this case, the auxiliary pressure $P_H$ is determined by the ratio of the fluid throttle resistors 5 and 6, of which at least one is variable, such as resistor 5. In the embodiment of FIG. 1, it is not necessary for the differential pressure amplifier to produce the two output pressures $A^-$ and $A^+$, since only one output pressure is utilized.

Figure 2:
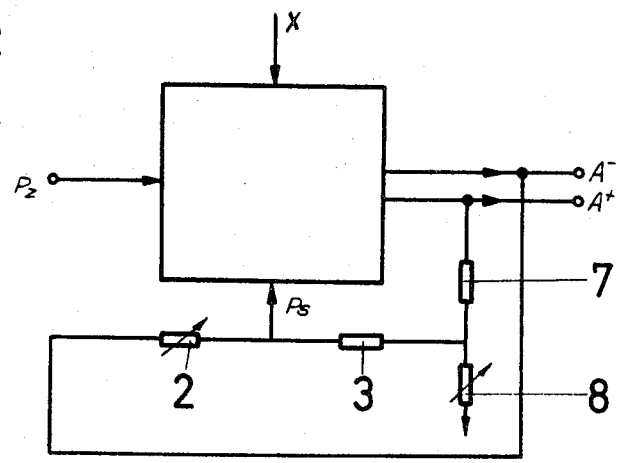
FIG. 2 is a schematic circuit diagram of a second embodiment, the control pressures of which are formed by one or two pressure distributors fed by the output pressures $A^+$ and $A^-$ of the amplifier.

The embodiment of FIG. 2, in contrast to that of FIG. 1, is based on a differential pressure amplifier 1 producing two output pressures $A^+$ and $A^-$, both of which are utilized. The control point pressure distributor, consisting of the fluid throttle resistors 2 and 3, is connected between the two output pressures $A^-$ and $A^+$.

For $x<P_{so}$, $A^- = P_z = A^-$max, and $A^+ = P_o = 0$ so that the following equation applies:

$$P_{so} = 1/1 + \lambda \ P_z$$

Once $x$ has reached the value $x_{so}$, the amplifier is actuated, and pressure $A^-$ *assumes the value* $A^-$ min $= P_o = 0$, whereas pressure $A^+$ increases to $P_z$. The control pressure assumes the value $P_{su} = \lambda/1 + \lambda P_z$ wherein $\lambda < 1$. In this embodiment, $P_{su}$ and $P_{so}$ are adjusted symmetrically with respect to $P_z/2$, i.e., $P_{so}$ and $P_{su}$ cannot be adjusted independently of each other, since $P_z =$ constant. This disadvantage cannot be avoided by again providing an additional pressure distributor with the resistors 7 and 8, which distributor is fed by the $A^+$ output and vents toward atmospheric pressure $P_o$. Between the resistors 7 and 8, the pressure $A^+$ can now be adjusted with the aid of the variable resistor 8, so that the control pressure $P_{su}$ is now determined by $$P_{su} = \lambda/1 + \lambda \ \epsilon P_z$$

Figure 3:
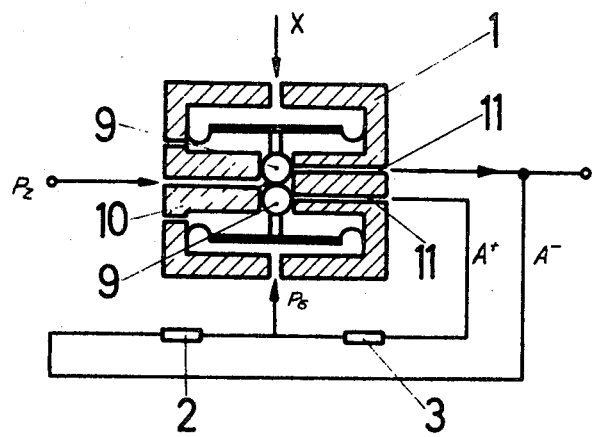
FIG. 3 shows a particularly advantageous embodiment of a differential pressure amplifier controlled in accordance with the present invention.

According to FIG. 3, a simple construction of a differential pressure amplifier 1 is provided, as has been described in German Patent Application No. P 19 55 083.5-13, which amplifier may be utilized in the embodiments of the invention illustrated in FIGS. 1 and 2. This amplifier has two balls 9 of identical diameter which are displaceably arranged in a bore 10 of the housing, and at least two channels 11 terminating in this housing bore, wherein the distance between the channels 11, as measured from one center to the other, corresponds to the diameter of the balls. The spacing of the feed channel ($P_z$) from one of the channels 11 is - as measured from one center to the other — approximately one-half the diameter of the balls 9.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A pneumatic two-position controller comprising: a differential pressure amplifier having first and second input pressure chambers defined by elastic walls, said first chamber being supplied with a first pressure to be controlled, said second chamber being supplied with a second control point pressure, and said amplifier providing at least one output resulting from control of an input pressure by said first and second pressures and proportional to the difference between said first and second pressures, and pressure distributor means for providing said second pressure to said amplifier in response to at least one of said amplifier outputs.

2. A pneumatic two-position controller as defined in claim 1, wherein said pressure distributor means includes pressure divider means for providing only a portion of one of said amplifier outputs to said amplifier.

3. A pneumatic two-position controller as defined in claim 1, wherein said pressure distributor means includes a pair of fluid throttle resistors connected in series between one output of said amplifier and an auxiliary pressure source, said second pressure supplied to said second chamber of the differential pressure amplifier being derived from a point between said resistors.

4. A pneumatic two-position controller as defined in claim 3, wherein one of said resistors is variable.

5. A pneumatic two-position controller as defined in claim 3, wherein said auxiliary pressure source includes an additional pressure distributor means connected to said input pressure supplied to said amplifier.

6. A pneumatic two-position controller as defined in claim 3, wherein said pressure distributor means is connected at one end to said one output of said amplifier through additional pressure distributor means including an additional pair of fluid throttle resistors connected in series to said one output, said pressure distributor means being connected to a point between said additional pair of resistors.

7. A pneumatic two-position controller as defined in claim 6, wherein one of said additional pair of fluid throttle resistors is variable.

8. A pneumatic two-position controller as defined in claim 6, wherein said amplifier provides first and second reciprocally varying outputs responsive to said input pressure controlled by said first and second pressures applied to said first and second chambers, respectively.

9. A pneumatic two-position controller as defined in claim 8, wherein the other end of said pressure distributor means is connected to the other output of said amplifier.

10. A pneumatic two-position controller as defined in claim 9, wherein one of said additional pair of fluid throttle resistors is variable.

11. A pneumatic two-position controller as defined in claim 1, wherein said differential amplifier includes first and second balls of identical diameter displaceably arranged in the bore of a housing, said balls being operatively connected to the elastic wall of a respective one of said first and second input pressure chambers so as to be displaced by movement thereof, said housing being provided with a pair of output bores spaced by the diameter of the balls and in alignment so as to be valved by said balls and an input bore providing said input pressure to said balls for application to said output bores in a controlled manner.

12. A pneumatic two-position controller as defined in claim 11, wherein said pressure distributor means includes a pair of fluid throttle resistors connected in series between one output of said amplifier and an auxiliary pressure source, said second pressure supplied to said second chamber of the differential pressure amplifier being derived from a point between said resistors.

13. A pneumatic two-position controller as defined in claim 12, wherein said auxiliary pressure source includes an additional pressure distributor means connected to said input pressure supplied to said input pressure supplied to said amplifier.

14. A pneumatic two-position controller as defined in claim 13, wherein said pressure distributor means is connected at one end to said one output of said amplifier through additional pressure distributor means including an additional pair of fluid throttle resistors connected in series to said one output, said pressure distributor means being connected to a point between said additional pair of resistors.

15. A pneumatic two-position controller as defined in claim 14, wherein the other end of said pressure distributor means is connected to the other output of said amplifier.

16. A pneumatic two-position controller as defined in claim 15, wherein one fluid throttle resistor in said pressure distributor means and in said additional pressure distributor means is variable.

* * * * *